United States Patent
Hata

(10) Patent No.: US 10,321,022 B2
(45) Date of Patent: Jun. 11, 2019

(54) SIGNAL PROCESSING DEVICE TO GENERATE LOW NOISE IMAGE SIGNAL IN LOW LIGHT INTENSITY ENVIRONMENT

(71) Applicant: SONY SEMICONDUCTOR SOLUTIONS CORPORATION, Kanagawa (JP)

(72) Inventor: Ryuhei Hata, Kanagawa (JP)

(73) Assignee: SONY SEMICONDUCTOR CORPORATION, Kanagawa (JP)

( * ) Notice: Subject to any disclaimer, the term of this patent is extended or adjusted under 35 U.S.C. 154(b) by 0 days.

(21) Appl. No.: 15/323,139

(22) PCT Filed: May 29, 2015

(86) PCT No.: PCT/JP2015/065575
§ 371 (c)(1),
(2) Date: Dec. 30, 2016

(87) PCT Pub. No.: WO2016/009728
PCT Pub. Date: Jan. 21, 2016

(65) Prior Publication Data
US 2017/0163853 A1    Jun. 8, 2017

(30) Foreign Application Priority Data

Jul. 18, 2014 (JP) ................................. 2014-147432

(51) Int. Cl.
*H04N 5/225* (2006.01)
*H04N 5/235* (2006.01)
(Continued)

(52) U.S. Cl.
CPC ........... *H04N 5/217* (2013.01); *H04N 5/2256* (2013.01); *H04N 5/2354* (2013.01); *H04N 9/646* (2013.01);
(Continued)

(58) Field of Classification Search
CPC ...... H04N 5/217; H04N 9/646; H04N 5/2256; H04N 5/2354; H04N 9/77; H04N 2209/047
See application file for complete search history.

(56) References Cited

U.S. PATENT DOCUMENTS

2008/0284880 A1* 11/2008 Numata ................. H04N 5/217
   348/241
2010/0329581 A1    12/2010 Yamazaki
(Continued)

FOREIGN PATENT DOCUMENTS

CN    101933043 A    12/2010
EP    2242020 A1    10/2010
(Continued)

OTHER PUBLICATIONS

International Search Report and Written Opinion of PCT Application No. PCT/JP2015/065575, dated Jul. 28, 2015, 4 pages of English Translation and 5 pages of ISRWO.
(Continued)

*Primary Examiner* — Lin Ye
*Assistant Examiner* — John H. Morehead, III
(74) *Attorney, Agent, or Firm* — Chip Law Group

(57) ABSTRACT

To generate a low noise image signal, even in image capturing in a low light intensity environment. In a signal processing device of an image capturing device; a noise reduction section removes noise from one of an invisible light signal and a color difference signal and from a luminance signal, and generates a group of signals from which noise is removed; and an image signal generation section generates an image signal including an adjusted luminance signal and an adjusted color difference signal at a ratio that is substantially equal to a ratio between the luminance signal and the color difference signal by adjusting the luminance signal and the color difference signal, and generates one of the adjusted luminance signal and the adjusted color difference signal based on the invisible light signal and the group of signals from which the noise is removed.

8 Claims, 12 Drawing Sheets

(51) Int. Cl.
  *H04N 5/217* (2011.01)
  *H04N 9/77* (2006.01)
  *H04N 9/64* (2006.01)
(52) U.S. Cl.
  CPC ......... *H04N 9/77* (2013.01); *H04N 2209/047* (2013.01)

(56) References Cited

U.S. PATENT DOCUMENTS

2012/0026357 A1* 2/2012 Katagairi ................. H04N 5/33
                                                    348/223.1
2014/0192202 A1* 7/2014 Sano ...................... H04N 5/332
                                                    348/164

FOREIGN PATENT DOCUMENTS

| JP | 2006-215677 A | 8/2006 |
| JP | 2009-187118 A | 8/2009 |
| JP | 2012-244533 A | 12/2012 |
| WO | 2009/098830 A | 8/2009 |

OTHER PUBLICATIONS

International Preliminary Report on Patentability of PCT Application No. PCT/JP2015/065575, dated Feb. 2, 2017, 5 pages of English Translation and 3 pages of IPRP.

* cited by examiner

SIGNAL PROCESSING DEVICE TO GENERATE LOW NOISE IMAGE SIGNAL IN LOW LIGHT INTENSITY ENVIRONMENT

CROSS REFERENCE TO RELATED APPLICATIONS

This application is a U.S. National Phase of International Patent Application No. PCT/JP2015/065575 filed on May 29, 2015, which claims priority benefit of Japanese Patent Application No. JP 2014-147432 filed in the Japan Patent Office on Jul. 18, 2014. Each of the above-referenced applications is hereby incorporated herein by reference in its entirety.

TECHNICAL FIELD

The present technology relates to a signal processing device, an image capturing device, and a signal processing method. Specifically, the present technology relates to an image capturing device used in cameras and the like, a signal processing device and a signal processing method in the image capturing device, and a program that causes a computer to execute the method.

BACKGROUND ART

Conventionally, when an image is captured in a low light intensity environment such as night time, an image capturing device that captures an image using an image sensor that can detect infrared light from the subject has been used. For example, from among image signals output from the image sensor, a visible light signal based on a visible light component and an infrared signal based on an infrared light component are mixed to generate an image signal. A system that forms a pseudo color image in this manner has been proposed (for example, see Patent Document 1).

CITATION LIST

Patent Literature

Patent Literature 1: JP 2012-244533 A

SUMMARY OF INVENTION

Technical Problem

Because, in image capturing under a low light intensity environment, a visible light signal has a low signal level, a luminance signal based on this visible light signal becomes a signal that has a relatively large noise component. In this respect, in the above-described prior art, the noise component is not removed when the infrared signal is mixed into this luminance signal. Therefore, a luminance signal obtained after mixing contains the noise component derived from the visible light signal, and there is a problem that a clear image cannot be obtained.

The present technology has been made in view of such a situation, and aims to generate a low noise image signal, even in image capturing in a low light intensity environment.

Solution to Problem

The present technology has been made to solve the above problems. According to a first aspect of the present technology, a signal processing device includes: a noise reduction section that removes noise from one of an invisible light signal and a color difference signal and from a luminance signal, and generates a group of signals from which noise is removed; and an image signal generation section that generates an image signal including an adjusted luminance signal and an adjusted color difference signal at a ratio that is substantially equal to a ratio between the luminance signal and the color difference signal by adjusting the luminance signal and the color difference signal, and generates one of the adjusted luminance signal and the adjusted color difference signal based on the invisible light signal and the group of signals from which the noise is removed. This causes the effects that the luminance signal and the color difference signal are adjusted while the ratio between the luminance signal and the color difference signal is maintained, and that one of the luminance signal and the color difference signal is adjusted based on the group of signals from which noise is removed.

According to the first embodiment, the noise reduction section may remove noise from the invisible light signal and the luminance signal, and generate the group of signals, and the image signal generation section may generate the adjusted luminance signal based on the invisible light signal, the invisible light signal from which the noise is removed, and the luminance signal from which the noise is removed. This causes the effect that the adjusted luminance signal is generated based on the invisible light signal, the invisible light signal from which noise is removed, and the luminance signal from which noise is removed.

According to the first aspect, the image signal generation section may generate the adjusted color difference signal based on the color difference signal. This causes the effect that the adjusted color difference signal is generated based on the color difference signal.

According to the first aspect, the signal processing device may further include a mixing section that mixes the generated adjusted luminance signal with the invisible light signal at a predetermined mixing ratio. This causes the effect that the adjusted luminance signal and the invisible light signal are mixed at a predetermined mixing ratio.

According to the first aspect, when the mixing section mixes the adjusted luminance signal with the invisible light signal that are included in a predetermined selected area of the image signals, the mixing section may mix them at a mixing ratio that differs from the predetermined mixing ratio. This causes the effect that the adjusted luminance signal and the invisible light signal included in the predetermined selected area are mixed at a mixing ratio that differs from the above mixing ratio.

According to the first aspect, the noise reduction section may remove noise from the color difference signal and the luminance signal, and generate the group of signals, and the image signal generation section may generate the adjusted color difference signal based on the invisible light signal, the color difference signal from which the noise is removed, and the luminance signal from which the noise is removed. This causes the effect that the adjusted color difference signal is generated based on the invisible light signal, the color difference signal from which noise is removed, and the luminance signal from which noise is removed.

According to the first aspect, the image signal generation section may generate the adjusted luminance signal based on the invisible light signal. This causes the effect that the adjusted luminance signal is generated based on the invisible light signal.

According to the first aspect, the invisible light signal may be an infrared signal corresponding to infrared light. This causes the effect that the luminance signal and the color difference signal are adjusted based on the infrared signal.

According to a second aspect of the present technology, an image capturing device includes: an image sensor that has a pixel surface on which pixels outputting image signals are arranged two-dimensionally; and a signal processing device that processes the image signals output from the image sensor. The signal processing device includes an image signal processing section that generates a luminance signal, a color difference signal, and an invisible light signal based on the image signal, a noise reduction section that removes noise from one of the invisible light signal and the color difference signal and from the luminance signal, and generates a group of signals from which noise is removed, and an image signal generation section that adjusts the luminance signal and color difference signal, generates an image signal including an adjusted luminance signal and an adjusted color difference signal at a ratio that is substantially equal to a ratio between the luminance signal and the color difference signal, and generates one of the adjusted luminance signal and the adjusted color difference signal based on the invisible light signal and the group of signals from which the noise is removed. This generates the effects that the luminance signal and the color difference signal are adjusted while the ratio between the luminance signal and the color difference signal is maintained, and that one of the luminance signal and the color difference signal is adjusted based on the group of signals from which noise is removed.

According to a third embodiment of the present technology, a signal processing method includes: a noise reduction procedure of removing noise from one of an invisible light signal and a color difference signal and from a luminance signal, and generating a group of signals from which noise is removed; an adjustment rate calculation procedure of calculating, for one of the luminance signal and the color difference signal, an adjustment rate for adjusting the luminance signal and the color difference signal based on the group of signals from which the noise is removed, while keeping a ratio between the luminance signal and the color difference signal; and an image signal generation procedure of adjusting the luminance signal and the color difference signal using the calculated adjustment rate, and generating an adjusted luminance signal and an adjusted color difference signal. This generates the effects that the luminance signal and the color difference signal are adjusted while the ratio between the luminance signal and the color difference signal is maintained, and that one of the luminance signal and the color difference signal is adjusted based on the group of signals from which noise is removed.

Advantageous Effects of Invention

With the present technology, it is possible to achieve the excellent effect of generating a low noise image signal even in image capturing in a low light intensity environment. The effect described here is not necessarily limited, but may be any effects described in the present disclosure.

DESCRIPTION OF EMBODIMENTS

Hereinafter, embodiments for carrying out the present technology (hereinafter, referred to as embodiments) will be described. The description will be made in the following order.
1. First Embodiment (an example of adjusting a luminance signal based on a signal from which noise is removed)
2. Second Embodiment (an example of adjusting color difference signals based on a signal from which noise is removed)
3. Third Embodiment (an example of mixing an adjusted luminance signal with an infrared signal)

1. First Embodiment

[Configuration of Image Capturing Device]

Figure 1:
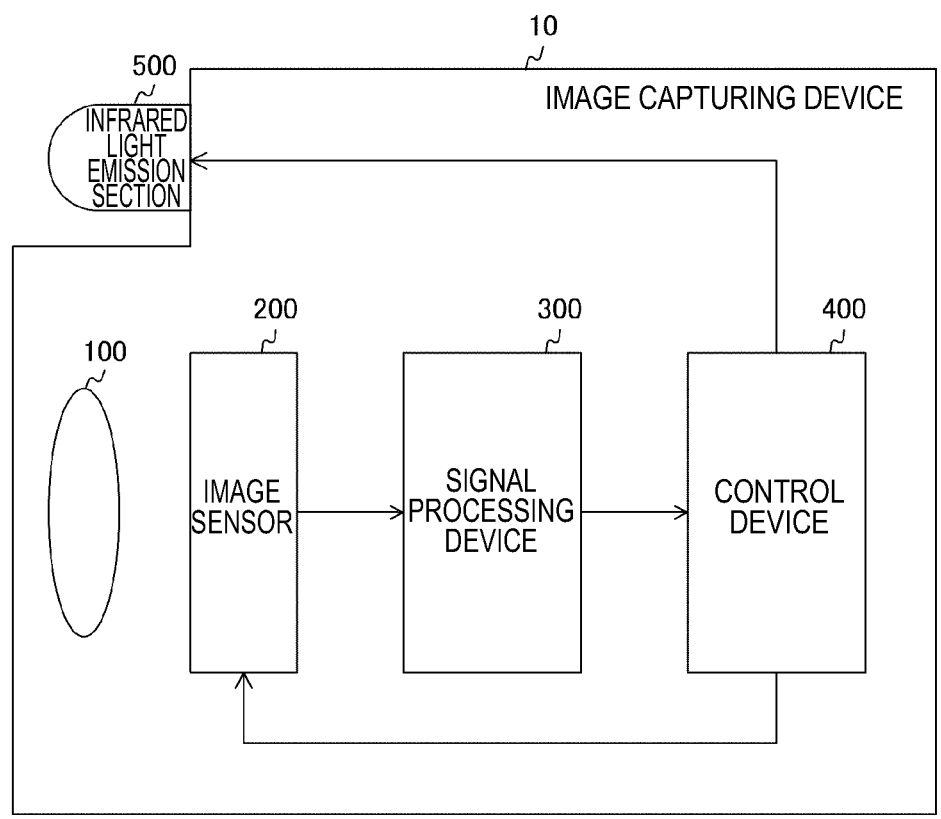
FIG. 1 is a diagram showing a configuration example of an image capturing device in an embodiment of the present technology.

FIG. 1 is a diagram showing a configuration example of an image capturing device in an embodiment of the present technology. An image capturing device 10 in the diagram has a lens 100, an image sensor 200, a signal processing device 300, a control device 400, and an infrared light emission section 500.

The lens 100 forms an optical image of the subject on the image sensor 200. The image sensor 200 converts the optical image formed by the lens 100 to image signals and outputs them. In this image sensor 200, pixels that generate the image signals are arranged two-dimensionally on the surface on which the optical image is formed. The image signal output from this pixel include a visible light signal corresponding to a visible light component and an infrared signal corresponding to an infrared light component.

An example of the image sensor 200 having such a pixel includes an image sensor having three types of pixels: a pixel that outputs an image signal corresponding to red light and infrared light, a pixel that outputs an image signal corresponding to green light and infrared light, and a pixel that outputs an image signal corresponding to blue light and infrared light. In addition, it is also possible to use an image sensor having four types of pixels that are obtained by adding a pixel that outputs an image signal corresponding to infrared light to these pixels. Hereinafter, an image signal corresponding to red light and infrared light, an image signal corresponding to green light and infrared light, an image signal corresponding to blue light and infrared light, and an image signal corresponding to infrared light will be referred to as an R+IR signal, a G+IR signal, a B+IR signal, and an IR signal, respectively. Further, pixels that output the R+IR signal, G+IR signal, B+IR signal, and IR signal will be referred to as an R+IR pixel, G+IR pixel, B+IR signal, and IR pixel, respectively. In order for each pixel to be formed as such a pixel corresponding to different colors, each pixel has a color filter. The above-described three types or four types of pixels are formed by adjusting spectral characteristics of this color filter to specific light.

The signal processing device 300 processes the image signal. This signal processing device 300 separates the image signal and generates a luminance signal, a color difference signal, and an IR signal, and processes these signals. Subsequently, it converts the resulting signals to an image signal containing a visible light signal only, and outputs it. The control device 400 controls the entire image capturing device 10. This control device 400 also has a function of outputting the image signal output from the signal processing device 300 to the outside of the image capturing device 10. The infrared light emission section 500 emits infrared light to the subject. This infrared light emission section 500 is controlled by the control device 400.

[Configuration of Signal Processing Device]

Figure 2:
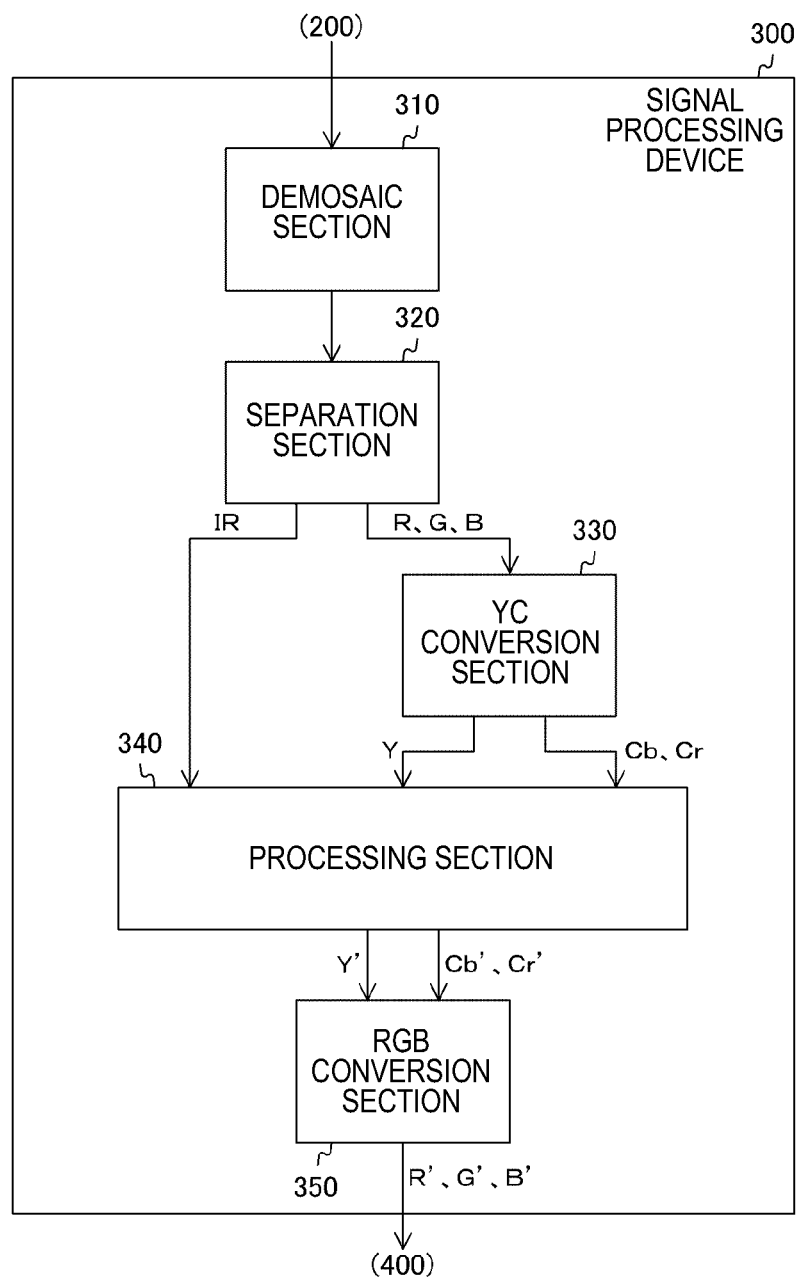
FIG. 2 is a diagram showing a configuration example of a signal processing device in the embodiment of the present technology.

FIG. 2 is a diagram showing a configuration example of the signal processing device in the embodiment of the present technology. The signal processing device 300 in the diagram has a demosaic section 310, a separation section 320, a YC conversion section 330, a processing section 340, and an RGB conversion section 350.

The demosaic section 310 performs demosaic processing on the image signal. This demosaic processing is processing of generating, for each of the R+IR pixel, G+IR pixel, B+IR pixel, and IR pixel, an image signal having a different color that a corresponding one of them does not have. A known method can be used as this demosaic processing. For example, it is possible to use a method in which, for example, when a pixel to be processed is an R+IR pixel, and a G+IR signal is generated by demosaic processing, an average value of G+IR signals output from G+IR pixels around that R+IR pixel is calculated, and this value is used as a G+IR signal for that R+IR pixel.

The separation section 320 separates the image signal to an IR signal and a visible light signal. This visible light signal includes an image signal corresponding to red light, an image signal corresponding to green light, and an image signal corresponding to blue light. Hereinafter, these will be referred to as an R signal, G signal, and B signal, respectively. Processing corresponding to the configuration of the above-described image sensor 200 is selected as processing in this separation section 320. When the image sensor has the R+IR, G+IR, B+IR, and IR pixels, by subtracting an IR signal output from the IR pixel from the R+IR, G+IR, and B+IR signals, it is possible to separate the R, G, and B signals. When the image sensor 200 does not have the IR pixel, it is possible to separate the R, G, B, and IR signals from the R+IR, G+IR, and B+IR signals using a computing equation obtained from the spectral characteristics of the color filter of the image sensor 200.

The YC conversion section 330 converts the R, G, and B signals to a luminance signal and color difference signals. In FIG. 2, Y indicates a luminance signal, and Cb and Cr indicate color difference signals. Here, the color difference signal Cb is a signal based on a difference between the B signal and the luminance signal, and the color difference signal Cr is a signal based on a difference between the R signal and the luminance signal. Conversion in the YC conversion section 330 can be carried out, for example, by the following conversion equations.

$$Y=0.299 \times R+0.587 \times G+0.114 \times B$$

$$Cb=-0.169 \times R-0.331 \times G+0.500 \times B$$

$$Cr=0.500 \times R-0.419 \times G-0.081 \times B$$

where R, G, and B indicate an R signal, G signal, and B signal, respectively.

The processing section 340 adjusts the luminance signal Y and the color difference signals Cb and Cr based on the luminance signal, the color difference signals, and the IR signal, to thereby generate an adjusted luminance signal Y' and adjusted color difference signals Cb' and Cr'. Operations of the processing section 340 will be described later. The RGB conversion section 350 converts the adjusted luminance signal and the adjusted color difference signals to new image signals (hereinafter, they will be referred to as R', G', and B' signals). These R', G', and B' signals converted by the RGB conversion section 350 are output to the outside of the image capturing device via the control device 400 and supplied for display on a monitor and the like. Conversion in the RGB conversion section 350 can be carried out, for example, by the following conversion equations.

$$R'=1.000 \times Y'+1.402 \times Cr'$$

$$G'=1.000 \times Y'-0.344 \times Cb'-0.714 \times Cr'$$

$$B'=1.000 \times Y'+1.772 \times Cb'$$

where Y' indicates an adjusted luminance signal. In addition, Cb' and Cr' indicate adjusted color difference signals. Further, R', G', and B' indicate an R signal, G signal, and B signal after conversion, respectively.

[Processing of Generating Adjusted Luminance Signal]

Figure 3:
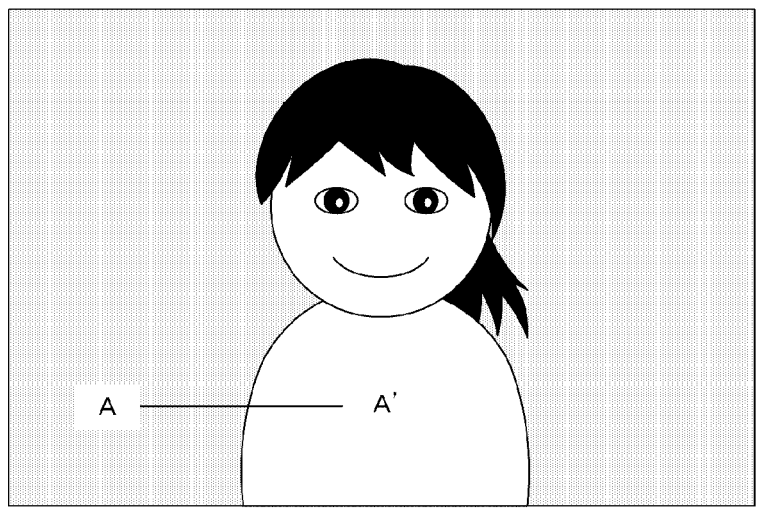
FIG. 3 is a diagram showing a subject example in a first embodiment of the present technology.

FIG. 3 is a diagram showing the subject in the first embodiment of the present technology. The same diagram shows an example of the case where an image of a person is captured in a low light intensity environment, such as night time. In such a case, the luminance signal and the color difference signals derived from the visible light component are signals having a low signal level and relatively large noise. In contrast to this, the infrared signal has a relatively high signal level in a portion related to the person. The line indicated by A and A' in the same diagram is a virtual line for identifying image signals on the screen. Because A is a background portion, and A' is a portion overlapping with a person, signal levels of corresponding image signals change suddenly on the way of transition from A to A'.

Figure 4:
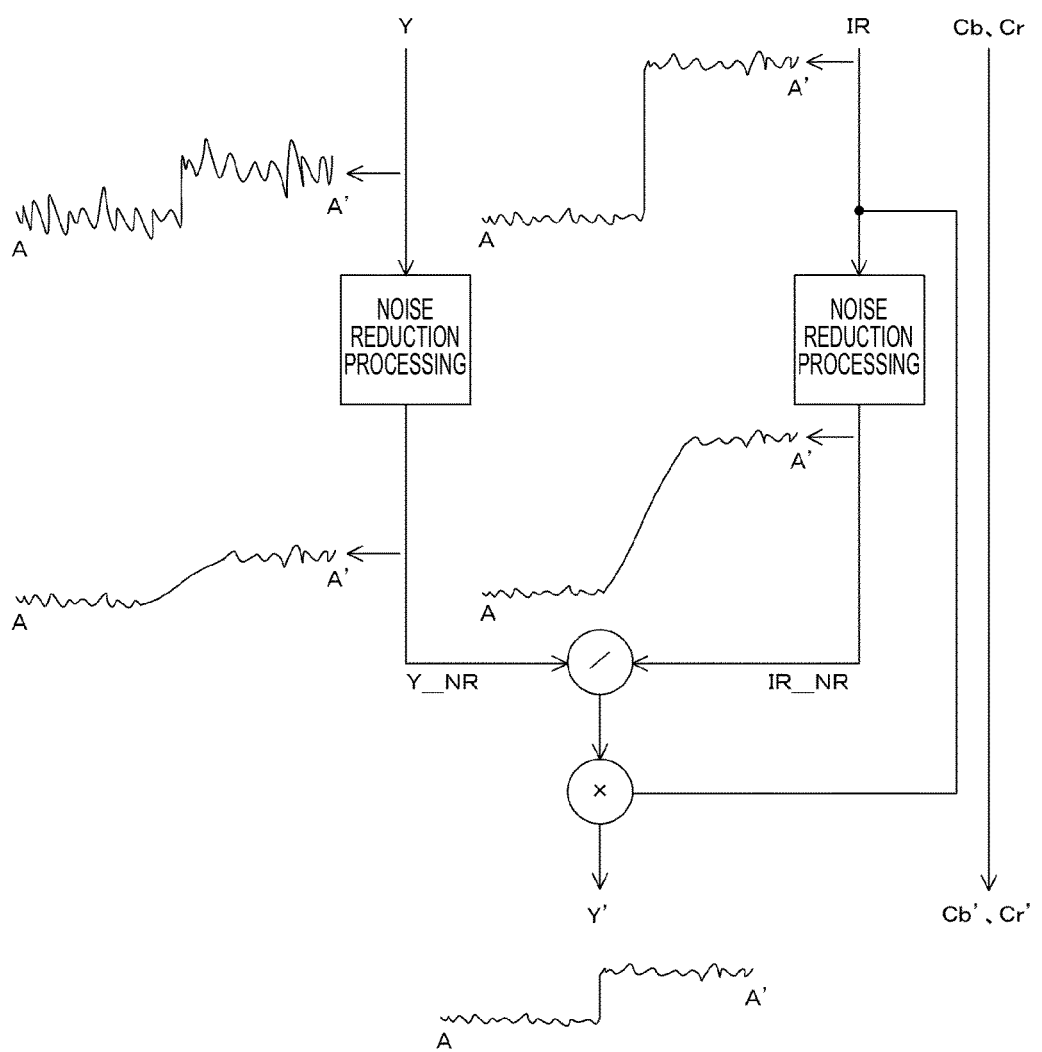
FIG. 4 is a diagram illustrating processing of generating an adjusted luminance signal and an adjusted color difference signal in the first embodiment of the present technology.

FIG. 4 is a diagram illustrating processing of generating the adjusted luminance signal and the adjusted color difference signals in the first embodiment of the present technology. The same diagram is a diagram illustrating processing in the processing section 340 when the subject shown in FIG. 3 is captured, and it shows processing of generating the adjusted luminance signal Y' from the luminance signal Y and the infrared signal IR. FIG. 4 also describes signal waveforms in the sections. These waveforms correspond to waveforms of luminance signals or infrared signals generated by the image signals located on the line indicated by A and A' in FIG. 3. Specifically, the waveform is obtained by drawing a line among the luminance signals or the infrared signals corresponding to the image signals output by the pixels located on the line indicated by A and A' in FIG. 3. A and A' in FIG. 4 respectively correspond to the image signals at the positions of A and A' in FIG. 3

As described above, the luminance signal in FIG. 4 has a relatively low signal level and a waveform with large noise. In addition, the infrared signal has a relatively high signal level and a waveform with low noise. Noise is removed by performing noise reduction processing on these signals. This noise reduction processing is processing of attenuating high frequency components of a signal using a sort of low-pass filter. In the same diagram, Y_NR and IR_NR respectively indicate a luminance signal and an infrared signal after noise reduction processing. Noise reduction processing attenuates and reduces noise components, which are high frequency components. At the same time, because the high frequency components are attenuated, luminance signal components and infrared signal components other than noise have slowly changing waveforms. When this is captured as an image, FIG. 3 is changed to an image having a blur on the outline of the person.

Next, Y_NR is divided by IR_NR. By this computation, it is possible to obtain a waveform (not shown) close to a direct current signal having a value nearly equal to the ratio of Y_NR to IR_NR. Because Y_NR is lower than IR_NR in terms of signal level, the above-described direct current signal has a value smaller than a value of "1" in the magnitude, such as, for example, a value of "0.2" or so. Next, this direct current signal is multiplied by the IR signal before noise reduction processing. In doing so, it is possible to obtain an adjusted luminance signal with low noise in which a sharp change in the signal components is maintained, as shown in FIG. 4. This adjusted luminance signal is a signal equivalent to a signal obtained by attenuating only noise components from the luminance signal before processing. Therefore, the adjusted luminance signal has a lower signal level than the IR signal. In the first embodiment of the present technology, computation like the one described above is not performed on the color difference signals Cb and Cr, and they are output as adjusted color difference signals.

[Configuration of Processing Section]

Figure 5:
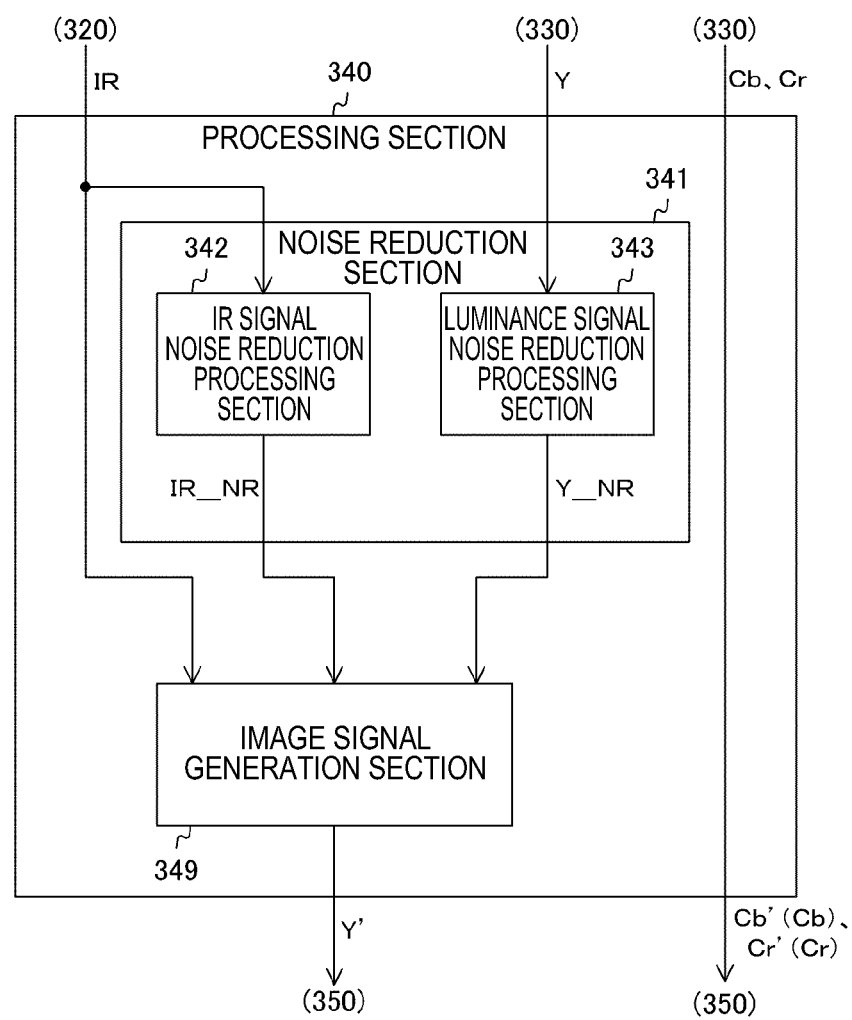
FIG. 5 is a diagram showing a configuration example of a processing section in the first embodiment of the present technology.

FIG. 5 is a diagram showing a configuration example of the processing section in the first embodiment of the present technology. The processing section 340 in the diagram has a noise reduction section 341 and an image signal generation section 349. The noise reduction section 341 removes noise from one of the IR signal and the color difference signal (Cb and Cr), and the luminance signal Y, and generates a group of signals from which noise is removed. In the first embodiment of the present technology, the noise reduction section 341 removes noise from the IR signal and the luminance signal Y. This noise reduction section 341 has an IR signal noise reduction processing section 342 and a luminance signal noise reduction processing section 343. The IR signal noise reduction processing section 342 removes noise from the IR signal and generates an IR_NR signal. In addition, the luminance signal noise reduction processing section 343 removes noise from the luminance signal and generates a Y_NR signal.

For example, a typical low-pass filter can be used as these noise reduction processing sections. In addition, two-dimensional noise reduction processing of removing noise by performing computation on image signals belonging to the same frame, that is, for example, noise reduction processing by performing averaging, may be carried out. Further, three-dimensional noise reduction processing of removing noise using image signals belonging to a plurality of consecutive frames may also be performed. This three-dimensional noise reduction processing will be described later.

As such, noise reduction processing of various sorts can be used. However, noise reduction processing devices that have the same characteristics, for example, in a cut-off frequency need to be adopted as the IR signal noise reduction processing section 342 and the luminance signal noise reduction processing section 343. This is because, as illustrated in FIG. 4, the direct current signal is generated by division processing, and thus their waveforms need to have similar characteristics as signal waveforms after noise reduction processing. Noise removing processing may also be performed on the color difference signals Cb and Cr. However, it needs to be mild noise removing processing so as not to cause the above-described blur on the outline of the image.

The image signal generation section 349 generates an image signal including the adjusted luminance signal Y' and the adjusted color difference signals Cb' and Cr' at the ratio approximately equal to the ratio between the luminance signal Y and the color difference signals Cb and Cr by adjusting the luminance signal Y and the color difference signal Cb and Cr. At this time, the adjusted luminance signal Y' or one of the adjusted color difference signals Cb' and Cr' is generated based on the IR signal and the above-described group of signals from which noise is removed. In the first embodiment of the present technology, the image signal generation section 349 generates the adjusted luminance signal Y' from the IR signal, the IR_NR signal, and the Y_NR signal. This processing in the image signal generation section 349 corresponds to division processing and multiplication processing illustrated in FIG. 4. Specifically, the adjusted luminance signal Y' is generated by the following equation.

$$Y'=(Y\_NR/IR\_NR) \times IR$$

where, Y_NR and IR_NR respectively indicate a luminance signal and an infrared signal after noise reduction processing. In addition, IR indicates an infrared signal. As described above, no special processing is performed on the color difference signals Cb and Cr, and they are output as the color difference signals Cb' and Cr'. Further, the adjusted luminance signal Y' is equivalent to a signal obtained by attenuating only noise components from the luminance signal Y. Therefore, the ratios between the luminance signal Y and the color difference signals Cb and Cr and between the adjusted luminance signal Y' and the adjusted color difference color signals Cb' and Cr' can have approximately equal values.

Here, coefficients used to make the ratio between the adjusted luminance signal and the adjusted color difference signals equal to the ratio between the luminance signal and the color difference signals when the adjusted luminance signal and the adjusted color difference signals are generated, are expressed as adjustment rates. In the first embodiment of the present technology, this adjustment rate for the luminance signal becomes Y_NR/IR_NR according to the above-described equation, and the adjustment rate for the color difference signals becomes "1".

[Three-Dimensional Noise Reduction Processing]

Figure 6:
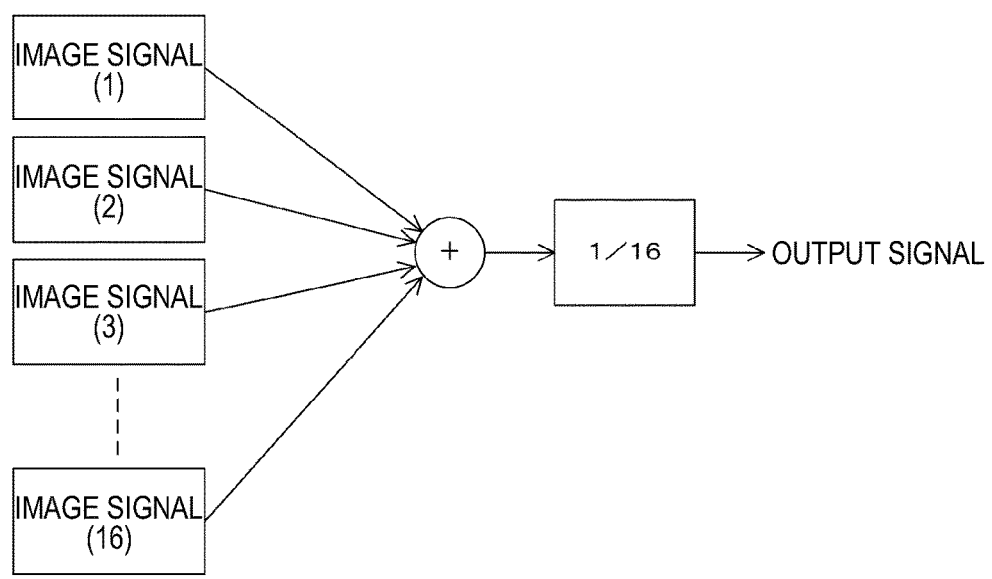
FIG. 6 is a diagram showing a configuration example of a three-dimensional noise reduction processing section in the first embodiment of the present technology.

FIG. 6 is a diagram showing a configuration example of a three-dimensional noise reduction processing section in the first embodiment of the present technology. The three-dimensional noise reduction processing section in the diagram sums image signals of consecutive 16 frames for each pixel. Subsequently, it divides the result by 16, which is the number of summed image signals, and outputs the result. In this manner, noise components that occur randomly are averaged, to thereby remove noise. Three-dimensional noise reduction processing has the higher noise removal capability than two-dimensional noise reduction processing. On the other hand, there is a problem that a blur occurs in an image when three-dimensional noise reduction processing is performed on a moving image. However, in the first embodiment of the present technology, computation by the image signal generation section 349 can correct this blur in the image.

[Arrangement of Pixels in Image Sensor]

Figure 7A:
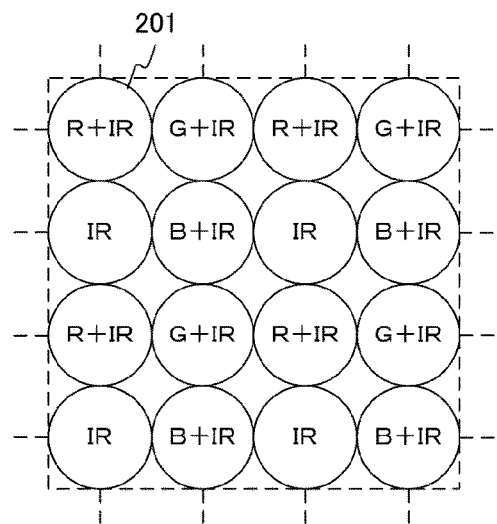
FIGS. 7a, 7b and 7c are a diagram showing a pixel arrangement example in an image sensor in the first embodiment of the present technology.
Figure 7B:
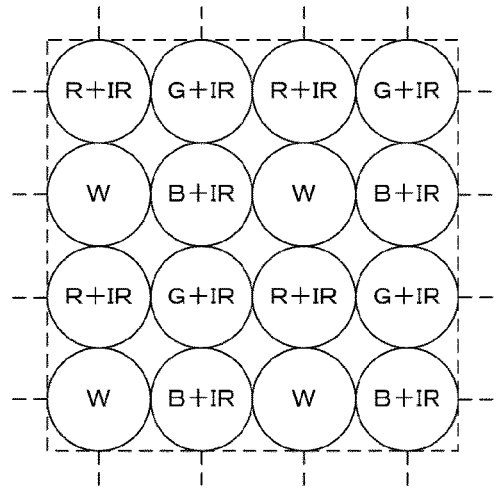
Figure 7C:
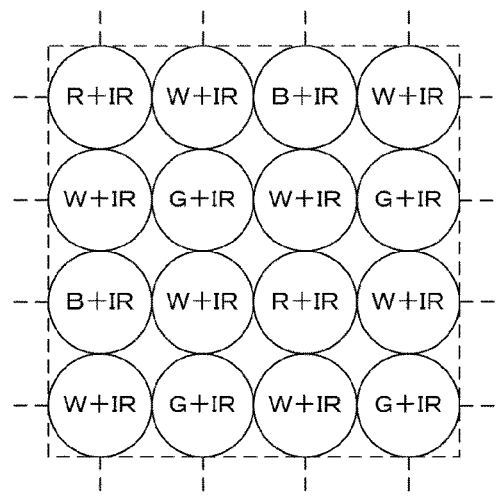

FIGS. 7a, 7b and 7c are a diagram showing a pixel arrangement example in the image sensor in the first embodiment of the present technology. Figure a in the diagram shows an example of the case where the image sensor 200 has R+IR, G+IR, B+IR, and IR pixels. As shown in the diagram, the image sensor 200 has pixels 201 arranged in a two-dimensional lattice form. The letters in the diagram indicate types of pixels on which those letters are appended. For example, a pixel to which "R+IR" is appended indicates an R+IR pixel. Figure b in the diagram shows an example of the case where, among the pixels in Figure a, the IR pixels are replaced with W pixels corresponding to white light. In addition, Figure c in the diagram shows an example of the case where the image sensor 200 has R+IR, G+IR, B+IR, and W+IR pixels. Here, the W+IR pixels are pixels corresponding to white light and infrared light.

[Signal Processing Procedure]

Figure 8:
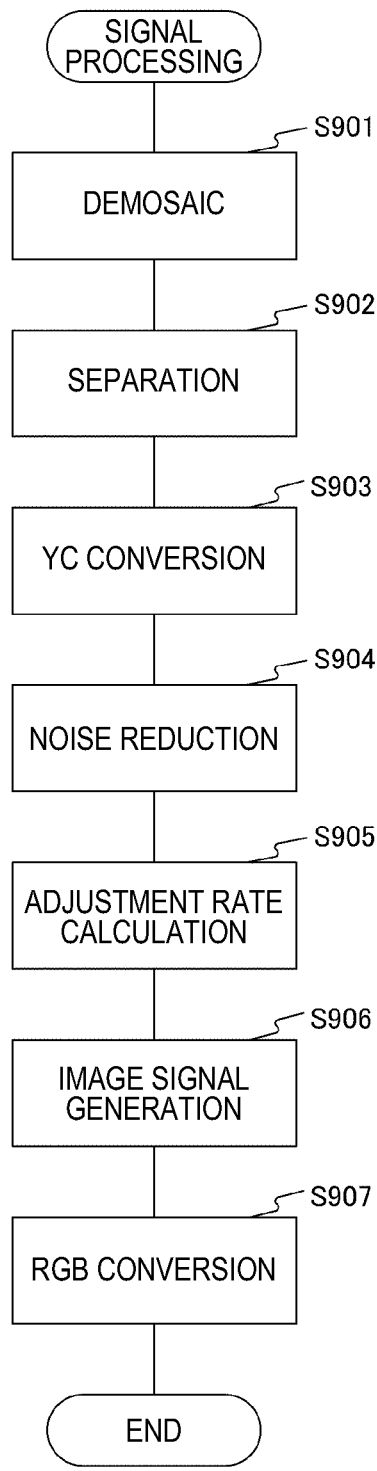
FIG. 8 is a diagram showing an example of a signal processing procedure in the first embodiment of the present technology.

FIG. 8 is a diagram showing an example of a signal processing procedure in the first embodiment of the present technology. The signal processing device 300 performs demosaic processing on an input image signal (step S901). Next, the signal processing device 300 separates the image signal subjected to demosaic processing into an IR signal and R, G, and B signals (step S902). Next, a luminance signal Y and color difference signals Cr and Cb are generated from the R, G, and B signals among the separated signals (step S903). Next, the signal processing device 300 performs noise reduction processing (step S904). In the first embodiment of the present technology, noise reduction processing is performed on the IR signal and the luminance signal Y. Next, the signal processing device 300 performs adjustment rate calculation processing (step S905). Because, as described above, in the first embodiment of the present technology, this adjustment rate for the color difference signals is "1", only an adjustment rate for the luminance signal is calculated.

The signal processing device 300 calculates the adjustment rate for the luminance signal based on the expression Y_NR/IR_NR. Next, the signal processing device 300 adjusts the luminance signal and the color difference signals using these adjustment rates, and performs image signal generation processing to generate an adjusted luminance signal and adjusted color difference signals (step S906). Specifically, an adjusted luminance signal Y' and adjusted color difference signals Cb' and Cr' are generated based on the following equations.

$Y'=(Y\_NR/IR\_NR) \times IR$ $Cb'=Cb$ $Cr'=Cr$

In the end, the signal processing device 300 converts the adjusted luminance signal and the adjusted color difference signal to R', G', and B' signals (step S907).

As such, in the first embodiment of the present technology, the adjusted luminance signal and the adjusted color difference signals, which are respectively obtained by adjusting the luminance signal and the color difference signals, are generated. At this time, by generating the adjusted luminance signal by removing noise from the luminance signal, it is possible to generate a low noise image signal even in image capturing in a low light intensity environment. Further, according to the first embodiment of the present technology, because the ratio between the adjusted luminance signal and the adjusted color difference signals is approximately equal to the ratio between the luminance signal and the color difference signals, the color reproductivity can be improved.

2. Second Embodiment

In the above-described first embodiment of the present technology, the adjusted luminance signal has been generated based on the signal from which noise is removed. Meanwhile, in the second embodiment of the present technology, adjusted color difference signals are generated based on signals from which noise is removed.

[Processing of Generating Adjusted Color Difference Signal]

Figure 9:
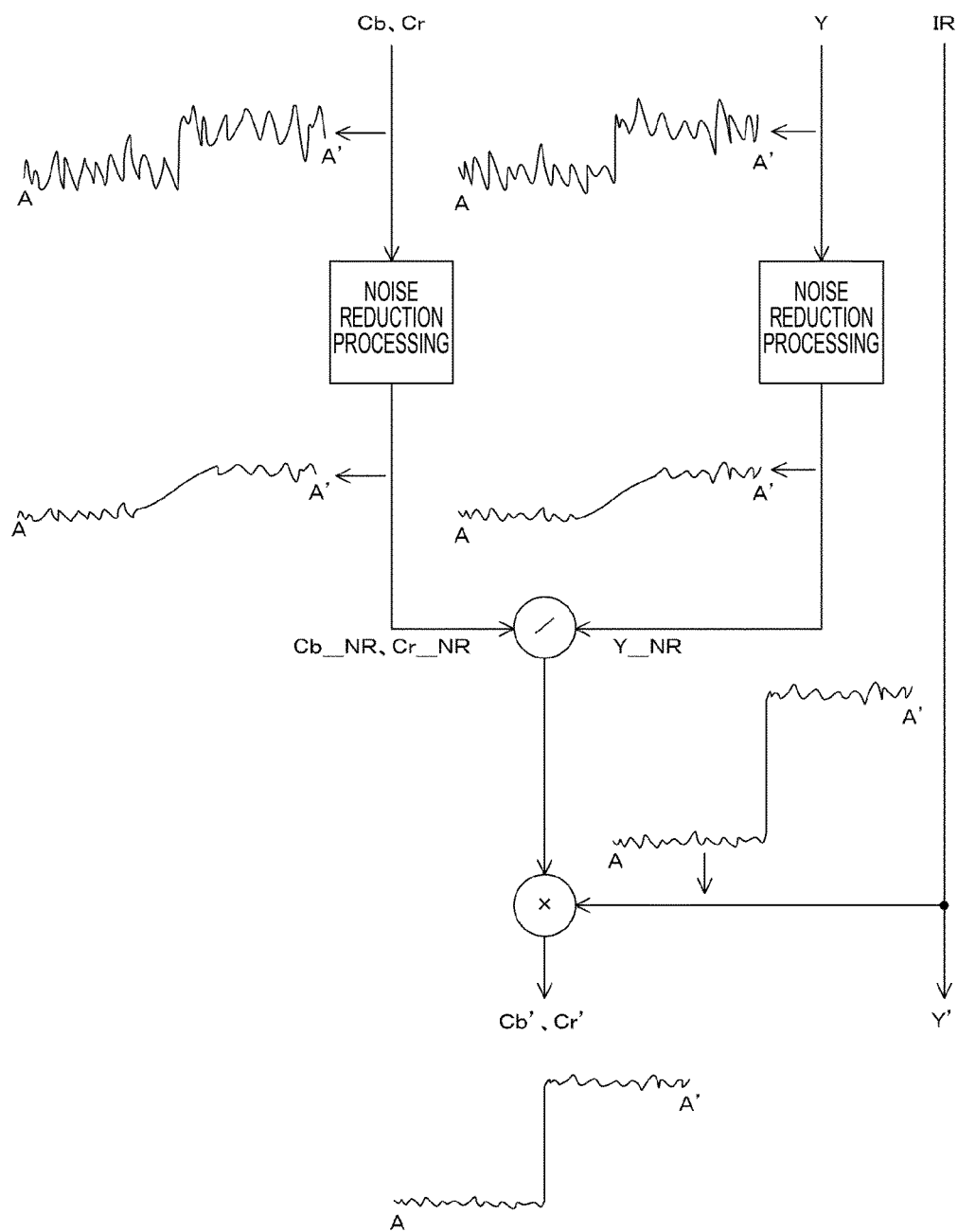
FIG. 9 is a diagram illustrating processing of generating an adjusted luminance signal and adjusted color difference signals according to a second embodiment of the present technology.

FIG. 9 is a diagram illustrating processing of generating an adjusted luminance signal and adjusted color difference signals in the second embodiment of the present technology. The same diagram illustrates processing in the processing section 340 when the subject shown in FIG. 3 is captured. In the second embodiment of the present technology, noise reduction processing is performed on a luminance signal and color difference signals. Cb_NR and Cr_NR indicate color difference signals after noise reduction processing. As shown in the diagram, Cb_NR and Cr_NR have signal waveforms at a similar level.

These Cb_NR and Cr_NR are divided by Y_NR. By this computation, it is possible to obtain a waveform (not shown) close to a direct current signal having a value nearly equal to the ratio of Cb_NR or Cr_NR to Y_NR. Because Cb_NR and Cr_NR, and Y_NR have substantially the same signal level, the above-described direct current signal has a value close to a value of "1" in the magnitude, such as, for example, a value of "0.9" or so. Next, this direct current signal is multiplied by an IR signal. In doing so, it is possible to obtain an adjusted color signal with low noise in which a sharp change in signal components are maintained, as shown in FIG. 9. In addition, in the second embodiment of the present technology, the IR signal is output as the adjusted luminance signal. As such, because processing in the second embodiment of the present technology is according to the scheme in which the IR signal that keeps a signal level is converted to an adjusted luminance signal and adjusted color difference signals, unlike the scheme shown in FIG. 4, it is possible to obtain the adjusted luminance signal and the adjusted color difference signals having a high signal level.

[Configuration of Processing Section]

Figure 10:
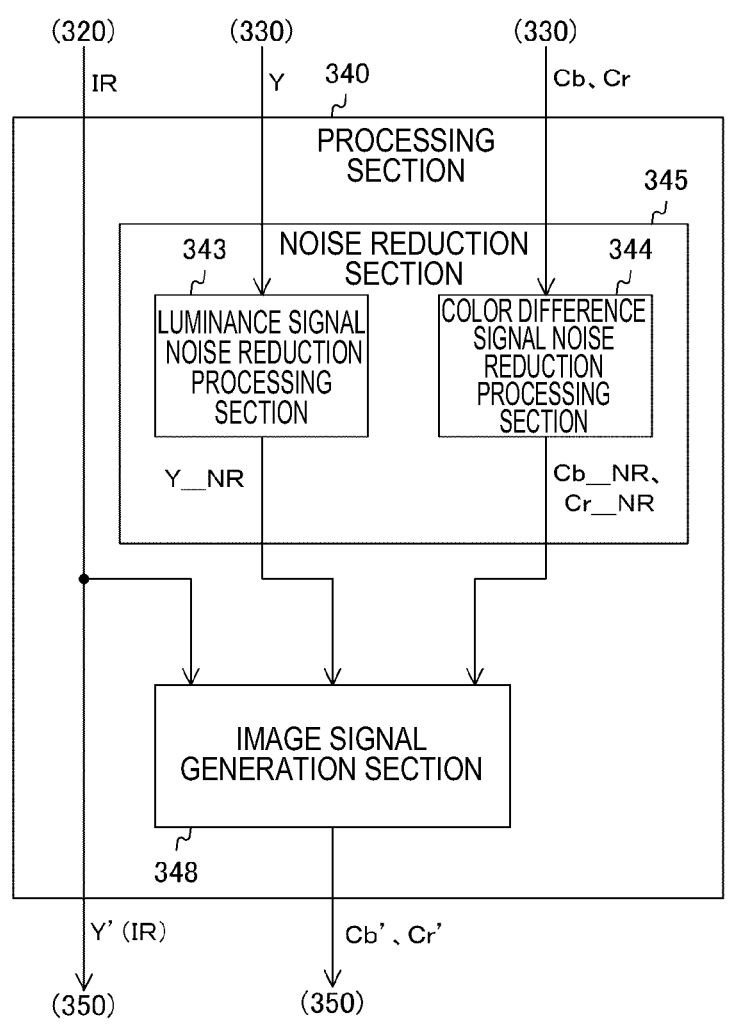
FIG. 10 is a diagram showing a configuration example of a processing section in the second embodiment of the present technology.

FIG. 10 is a diagram showing a configuration example of a processing section in the second embodiment of the present technology. The processing section 340 in the diagram has a noise reduction section 345 and an image signal generation section 348. The noise reduction section 345 removes noise from the luminance signal Y and the color difference signals Cb and Cr. This noise reduction section 345 has a luminance signal noise reduction processing section 343 and a color difference signal noise reduction processing section 344. The color difference signal noise reduction processing section 344 removes noise from the color difference signals and generates Cb_NR and Cr_NR signals. The various types of noise reduction processing devices described above in the first embodiment of the present technology can be used as this color difference signal noise reduction processing section 344. However, it is necessary to use a noise reduction processing device that has the same characteristics as the luminance signal noise reduction processing section 343.

The image signal generation section 348 generates the adjusted color difference signals Cb' and Cr' from the IR signal, IR_Y signal, Cb_NR signal, and Cr_NR signal. This processing in the image signal generation section 348 corresponds to division processing and multiplication processing illustrated in FIG. 9. Specifically, the adjusted color difference signals Cb' and Cr' are generated by the following equations.

$$Cb'=(Cb\_NR/Y\_NR) \times IR$$

$$Cr'=(Cr\_NR/Y\_NR) \times IR$$

where, Cb_NR and Cr_NR indicate color difference signals after noise reduction processing. As described above, the IR signal is output as the adjusted luminance signal Y'. In addition, as is clear from the above equations, Cb' and Cr' are obtained by adjusting the signal level of the IR signal based on the ratio between Cb_NR and Y_NR and the ratio between Cr_NR and Y_NR, respectively. Therefore, the ratios between the luminance signal Y and the color difference signals Cb and Cr and between the adjusted luminance signal Y' and the adjusted color difference signals Cb' and Cr' can have approximately equal values. Further, in the second embodiment of the present technology, the adjustment rate for the luminance signal becomes "1", and the adjustment rate for the color difference signal becomes Cb_NR/Y_NR or Cr_NR/Y_NR according to the above equations.

Because, except for this, the configurations of the signal processing device 300 and the image capturing device 10 in the second embodiment of the present technology are similar to those in the above-described first embodiment, their description will be omitted.

As such, because, in the second embodiment of the present technology, the adjusted luminance signal and the adjusted color difference signals are generated from the IR signal while keeping the signal level, the adjusted luminance signal and the adjusted color difference signals with a high signal level can be obtained. Further, because, also in the second embodiment of the present technology, the ratio between the adjusted luminance signal and the adjusted color difference signals is approximately equal to the ratio between the luminance signal and the color difference signals, the color reproductivity can be improved.

Third Embodiment

In the above-described first embodiment of the present technology, the adjusted luminance signal and the adjusted color difference signals have been converted to the new image signals. Meanwhile, in the third embodiment of the present technology, a new adjusted luminance signal is generated by mixing an IR signal into an adjusted luminance signal. Subsequently, this new adjusted luminance signal and adjusted color difference signals are converted to new image signals.

[Configuration of Processing Section]

Figure 11:
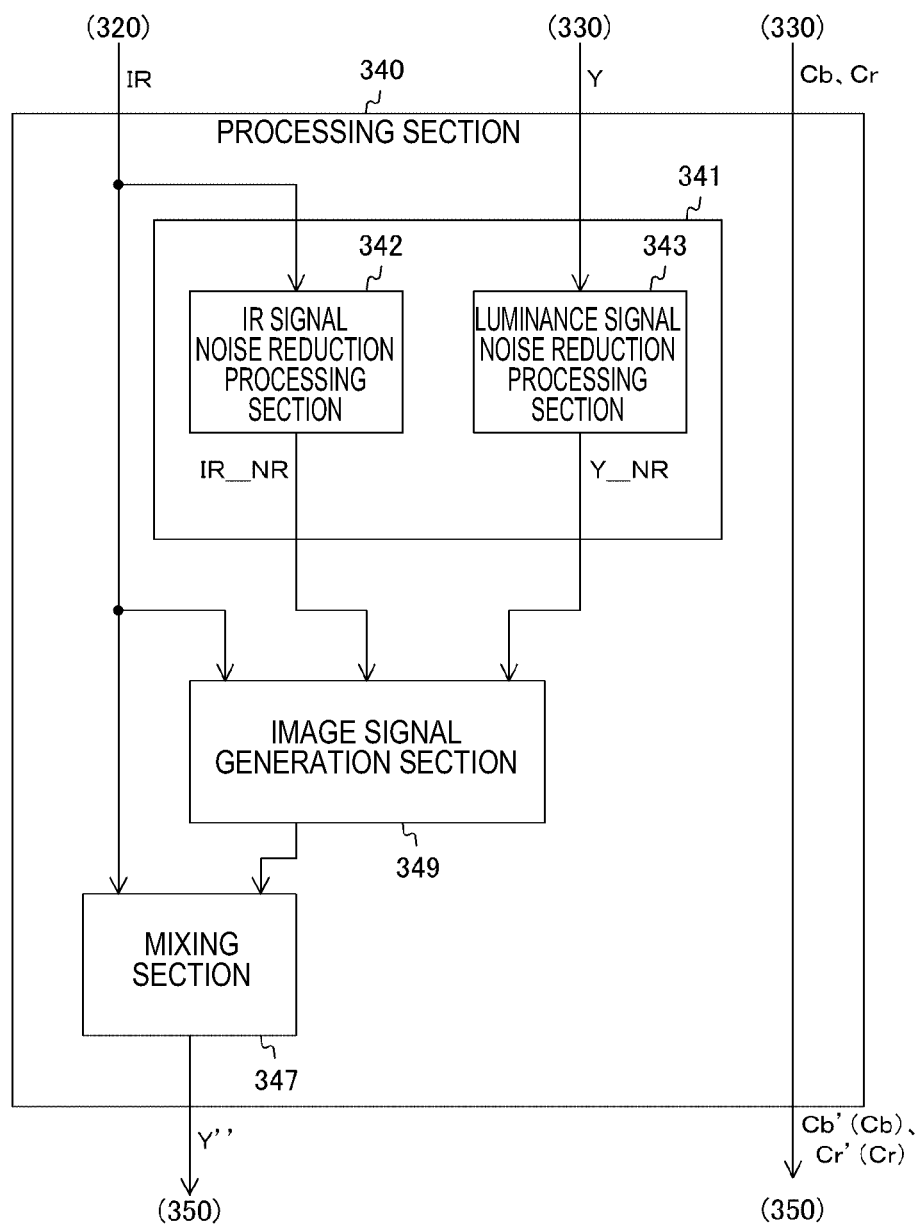
FIG. 11 is a diagram showing a configuration example of a processing section according to a third embodiment of the present technology.

FIG. 11 is a diagram showing a configuration example of a processing section in the third embodiment of the present technology. The processing section 340 in the diagram differs from the processing section 340 illustrated in FIG. 5 in that it has a mixing section 347. The mixing section 347 mixes an adjusted luminance signal Y' generated by the image signal generation section 349 with an IR signal at a predetermined mixing ratio. This mixing is performed according to the following equation.

$$Y''=(1-\alpha) \times IR + \alpha \times Y'$$

where Y" indicates a new adjusted luminance signal that is generated after mixing, and α indicates a mixing ratio. As described above, the adjusted luminance signal in the first embodiment of the present technology has a lower signal level than the IR signal. However, by mixing the IR signal to this adjusted luminance signal, the signal level can be increased.

Further, by making the mixing ratio α changeable, characteristics of the new adjusted luminance signal can be changed. For example, when α is set at a value close to 1, an image having a low signal level but with the high color reproductivity can be obtained. Meanwhile, when α is set at a value close to 0, the signal level increases, and therefore, an image with high visibility can be obtained. However, in this case, because the signal level is not adjusted for the color difference signals, the obtained image is changed in color. Further, when α is set at 0, the obtained image is a monochrome image. As such, the characteristics of the adjusted luminance signal can be changed according to use of the image.

Because, except for this, the configurations of the processing section 340, the signal processing device 300, and the image capturing device 10 are similar to those in the above-described first embodiment, their description will be omitted.

As such, according to the third embodiment of the present technology, by mixing the IR signal into the adjusted luminance signal, the characteristics of the adjusted luminance signal can be changed according to intended use of it.

[Variant]

In the above-described third embodiment, all adjusted luminance signals have been mixed with IR signals at the same mixing ratio α. Meanwhile, in a variant of the third embodiment of the present technology, a selected area is set on a screen, and mixing is carried out at a different ratio for adjusted luminance signals included in this selected area.

Figure 12:
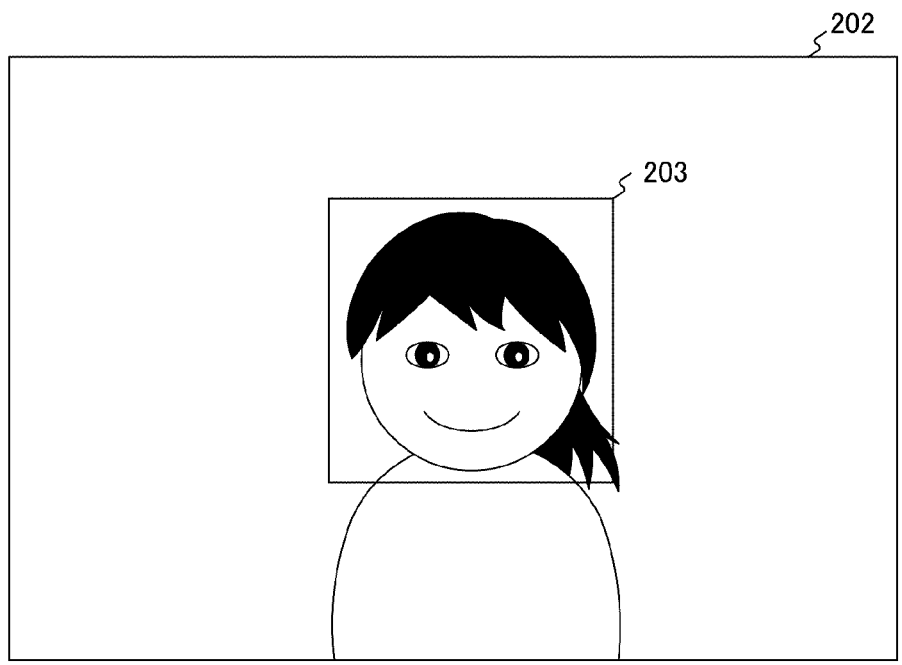
FIG. 12 is a diagram showing an example of a screen on which a selected area is set in a variant of the third embodiment of the present technology.

FIG. 12 is a diagram showing an example of the screen on which the selected area is set in the variant of the third embodiment of the present technology. A selected area 203 is set on a screen 202 in the diagram. This selected area 203 can be set, for example, on an area including the face of the person who is the subject. The mixing ratio α for the adjusted luminance signals corresponding to an image included in this selected area 203 has a different value from that of the other area. In the above case, when the adjusted luminance signal Y" included in the selected area 203 is generated, α can be set at "0", thereby increasing the visibility of the face. In the area except for the selected area 203, α is set at, for example, "1", thereby increasing the color reproductivity and enabling easier recognition of color of the person's clothes. In the variant of the third embodiment of the present technology, the signal processing device 300 determines whether or not an image signal is included in the selected area 203, and changes the value of α. A plurality of selected area may also be set for one screen. In addition, a may be changed gradually on the border of the selected area 203. In this case, the discontinuity in the image on the border of the selected area 203 can be alleviated.

As such, according to the variant of the third embodiment of the present technology, by setting the selected area on the screen and changing the mixing ratio, the characteristics of the image included in the selected area can be differentiated from those in the other area. Because the image can be changed to an image in which one of the color reproductivity and the visibility is increased according to intended use of the image, the usability can be improved.

As such, according to the embodiments of the present technology, by generating an adjusted luminance signal or adjusted color difference signals that are obtained by removing noise from a luminance signal, a low noise image signal can be generated even in image capturing in a low light intensity environment.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a hard disk, a CD (Compact Disc), an MD (Mini-Disc), and a DVD (Digital Versatile Disk), a memory card, and a Blu-ray disc (registered trademark) can be used.

In addition, the effects described in the present specification are not limiting but are merely examples, and there may be additional effects.

Additionally, the present technology may also be configured as below.

(1)
A signal processing device including:
a noise reduction section that removes noise from one of an invisible light signal and a color difference signal and from a luminance signal, and generates a group of signals from which noise is removed; and
an image signal generation section that generates an image signal including an adjusted luminance signal and an adjusted color difference signal at a ratio that is substantially equal to a ratio between the luminance signal and the color difference signal by adjusting the luminance signal and the color difference signal, and generates one of the adjusted luminance signal and the adjusted color difference signal based on the invisible light signal and the group of signals from which the noise is removed.

(2)
The signal processing device according to (1), wherein the noise reduction section removes noise from the invisible light signal and the luminance signal, and generates the group of signals, and
the image signal generation section generates the adjusted luminance signal based on the invisible light signal, the invisible light signal from which the noise is removed, and the luminance signal from which the noise is removed.

(3)
The signal processing device according to (2), wherein the image signal generation section generates the adjusted color difference signal based on the color difference signal.

(4)
The signal processing device according to (2) or (3), further including
a mixing section that mixes the generated adjusted luminance signal with the invisible light signal at a predetermined mixing ratio.

(5)
The signal processing device according to (4), wherein when the mixing section mixes the adjusted luminance signal with the invisible light signal that are included in a predetermined selected area of the image signals, the mixing section mixes them at a mixing ratio that differs from the predetermined mixing ratio.

(6)
The signal processing device according to (1), wherein the noise reduction section removes noise from the color difference signal and the luminance signal, and generates the group of signals, and
the image signal generation section generates the adjusted color difference signal based on the invisible light signal, the color difference signal from which the noise is removed, and the luminance signal from which the noise is removed.

(7)
The signal processing device according to (6), wherein the image signal generation section generates the adjusted luminance signal based on the invisible light signal.

(8)
The signal processing device according to (1) to (7), wherein the invisible light signal is an infrared signal corresponding to infrared light.

(9)
An image capturing device including:
an image sensor that has a pixel surface on which pixels outputting image signals are arranged two-dimensionally; and
a signal processing device that processes the image signals output from the image sensor,
wherein the signal processing device includes
an image signal processing section that generates a luminance signal, a color difference signal, and an invisible light signal based on the image signal,
a noise reduction section that removes noise from one of the invisible light signal and the color difference signal and from the luminance signal, and generates a group of signals from which noise is removed, and
an image signal generation section that adjusts the luminance signal and color difference signal, generates an image signal including an adjusted luminance signal and an adjusted color difference signal at a ratio that is substantially equal to a ratio between the luminance signal and the color difference signal, and generates one of the adjusted luminance signal and the adjusted color difference signal based on the invisible light signal and the group of signals from which the noise is removed.

(10)
A signal processing method including:
a noise reduction procedure of removing noise from one of an invisible light signal and a color difference signal and from a luminance signal, and generating a group of signals from which noise is removed;
an adjustment rate calculation procedure of calculating, for one of the luminance signal and the color difference signal, an adjustment rate for adjusting the luminance signal and the color difference signal based on the group of signals from which the noise is removed, while keeping a ratio between the luminance signal and the color difference signal; and an image signal generation procedure of adjusting the luminance signal and the color difference signal using the calculated adjustment rate, and generating an adjusted luminance signal and an adjusted color difference signal.

REFERENCE SIGNS LIST 10 image capturing device
100 lens
200 image sensor
201 pixel
202 screen
203 selected area
300 signal processing device
310 demosaic section
320 separation section
330 YC conversion section
340 processing section
341, 345 noise reduction section
342 IR signal noise reduction processing section
343 luminance signal noise reduction processing section
344 color difference signal noise reduction processing section
347 mixing section
348, 349 image signal generation section
350 RGB conversion section
400 control device
500 infrared light emission section

The invention claimed is:
1. A signal processing device, comprising:
a noise reduction section configured to:
  remove noise from at least one of an invisible light signal, a color difference signal, or a luminance signal; and
  generate a group of signals from which the noise is removed;
an image signal generation section configured to:
  generate an image signal including an adjusted luminance signal and an adjusted color difference signal at a first ratio that is equal to a second ratio between the luminance signal and the color difference signal, based on an adjustment of the luminance signal and the color difference signal; and
  generate at least one of the adjusted luminance signal or the adjusted color difference signal, based on the invisible light signal and the group of signals from which the noise is removed,
  wherein the color difference signal and the luminance signal are derived from a visible light signal,
  wherein the color difference signal is based on a difference between a B signal and the luminance signal, and
  wherein the B signal corresponds to blue light of the visible light signal; and
a mixing section configured to:
  mix the generated adjusted luminance signal with the invisible light signal at a first mixing ratio; and
  mix the adjusted luminance signal with the invisible light signal at a second mixing ratio that differs from the first mixing ratio when the mixing section mixes the adjusted luminance signal with the invisible light signal that are included in a selected area of the image signal.

2. The signal processing device according to claim 1, wherein the noise reduction section is further configured to:
  remove the noise from the invisible light signal and the luminance signal; and
  generate the group of signals, and
wherein the image signal generation section is further configured to:
  generate the adjusted luminance signal, based on the invisible light signal from which the noise is removed and the luminance signal from which the noise is removed.

3. The signal processing device according to claim 2, wherein the image signal generation section is further configured to generate the adjusted color difference signal based on the color difference signal.

4. The signal processing device according to claim 1, wherein the noise reduction section is further configured to:
  remove the noise from the color difference signal and the luminance signal;
  and
  generate the group of signals; and
wherein the image signal generation section is further configured to generate the adjusted color difference signal, based on the invisible light signal, the color difference signal from which the noise is removed, and the luminance signal from which the noise is removed.

5. The signal processing device according to claim 4, wherein the image signal generation section is further configured to generate the adjusted luminance signal based on the invisible light signal.

6. The signal processing device according to claim 1, wherein the invisible light signal is an infrared signal corresponding to infrared light.

7. An image capturing device, comprising:
an image sensor that has a pixel surface, wherein pixels on the pixel surface are configured to output a plurality of image signals, wherein the pixels are arranged two-dimensionally on the pixel surface; and
a signal processing device configured to process the plurality of image signals output from the image sensor, wherein the signal processing device, includes:
  an image signal processing section configured to generate a luminance signal, a color difference signal, and an invisible light signal based on a first image signal of the plurality of image signals;
  a noise reduction section configured to:
    remove noise from at least one of the invisible light signal, the color difference signal, or the luminance signal, and
    generate a group of signals from which the noise is removed;
  an image signal generation section configured to:
    adjust the luminance signal and the color difference signal;
    generate a second image signal including the adjusted luminance signal and the adjusted color difference signal at a first ratio that is equal to a second ratio between the luminance signal and the color difference signal; and
    generate at least one of the adjusted luminance signal and the adjusted color difference signal, based on the invisible light signal and the group of signals from which the noise is removed,
  wherein the color difference signal and the luminance signal are derived from a visible light signal, wherein the color difference signal is based on a difference between a B signal and the luminance signal, and wherein the B signal corresponds to blue light of the visible light signal; and a mixing section configured to:

mix the generated adjusted luminance signal with the invisible light signal at a first mixing ratio; and mix the adjusted luminance signal with the invisible light signal at a second mixing ratio that differs from the first mixing ratio when the mixing section mixes the adjusted luminance signal with the invisible light signal that are included in a selected area of the image signal.

8. A signal processing method, comprising:

removing noise from at least one of an invisible light signal, a color difference signal, or a luminance signal;

generating a group of signals from which the noise is removed;

calculating an adjustment rate for at least one of adjusting the luminance signal or the color difference signal, based on the group of signals from which the noise is removed and a ratio between the luminance signal and the color difference signal;

adjusting at least one of the luminance signal and the color difference signal based on the calculated adjustment rate;

generating the adjusted luminance signal and the adjusted color difference signal, wherein the color difference signal and the luminance signal are derived from a visible light signal, wherein the color difference signal is based on a difference between a B signal and the luminance signal, and wherein the B signal corresponds to blue light of the visible light signal;

mixing the generated adjusted luminance signal with the invisible light signal at a first mixing ratio; and mixing the adjusted luminance signal with the invisible light signal at a second mixing ratio that differs from the first mixing ratio when the mixing section mixes the adjusted luminance signal with the invisible light signal that are included in a selected area of the image signal.

* * * * *